(12) United States Patent
Sullivan

(10) Patent No.: US 7,278,749 B2
(45) Date of Patent: Oct. 9, 2007

(54) GAUGE WITH LARGE ILLUMINATED GAUGE FACE

(76) Inventor: John T. Sullivan, 11339 Barley Field Way, Marriottsville, MD (US) 21104

(*) Notice: Subject to any disclaimer, the term of this patent is extended or adjusted under 35 U.S.C. 154(b) by 210 days.

(21) Appl. No.: 11/029,346

(22) Filed: Jan. 6, 2005

(65) Prior Publication Data
US 2006/0146542 A1    Jul. 6, 2006

(51) Int. Cl.
*G01D 11/28* (2006.01)
(52) U.S. Cl. .................. 362/30; 116/486; 116/DIG. 5; 116/DIG. 36; 340/815.4
(58) Field of Classification Search .................. 362/29, 362/30, 489; 116/284, 286–288, DIG. 5, 116/DIG. 36; 340/461, 815.4
See application file for complete search history.

(56) References Cited

U.S. PATENT DOCUMENTS

| | | | |
|---|---|---|---|
| 2,217,625 A | 1/1940 | Smith | |
| 2,280,700 A | 4/1942 | Hall | |
| 2,916,011 A | 12/1959 | Molis | |
| 4,163,428 A | 8/1979 | Ishikawa | |
| 4,215,647 A | 8/1980 | Fukasawa | |
| 4,218,726 A | 8/1980 | Fukasawa et al. | |
| 4,274,358 A | 6/1981 | Nakamura et al. | |
| 4,771,368 A | 9/1988 | Tsukamoto et al. | |
| 5,839,811 A | 11/1998 | Shimura | |
| 5,905,374 A | 5/1999 | Westberg et al. | |
| 5,915,822 A | 6/1999 | Ogura et al. | |
| 5,934,782 A | 8/1999 | Atkins et al. | |
| 5,982,168 A | 11/1999 | Westberg et al. | |
| 6,137,399 A | 10/2000 | Westbert et al. | |
| 6,276,804 B1 | 8/2001 | Tandler et al. | |
| 6,663,251 B2 | 12/2003 | Calvert | |
| 6,710,718 B2 * | 3/2004 | Rose ........................ 116/284 |

\* cited by examiner

*Primary Examiner*—Stephen F. Husar
(74) *Attorney, Agent, or Firm*—Diller, Ramik & Wight

(57) ABSTRACT

An instrument gauge for motor vehicles which includes a large front face lens, an annular spacer ring, a dial plate and a light-diffuser plate, all of which have relatively large diameter/circumferences and each being preferably made from transparent/translucent plastic material. An outermost circumferential edge portion of the light-diffuser plate rests upon a radially outwardly directed flange which unites a large outer chamber of an inner gauge housing with a smaller chamber thereof. The inner housing is also preferably made of transparent/translucent material. Light rays emitted from behind the light-diffuser board are transmitted to outermost circumferential edge portions of the dial plate to fully illuminate the same beyond that heretofore provided which prevents the utilization of larger indica and renders the same more readily viewable.

50 Claims, 6 Drawing Sheets

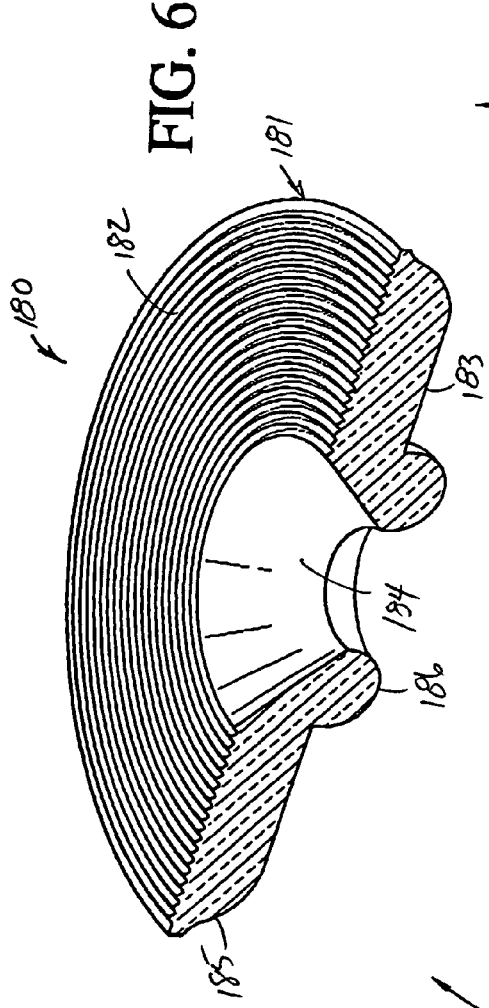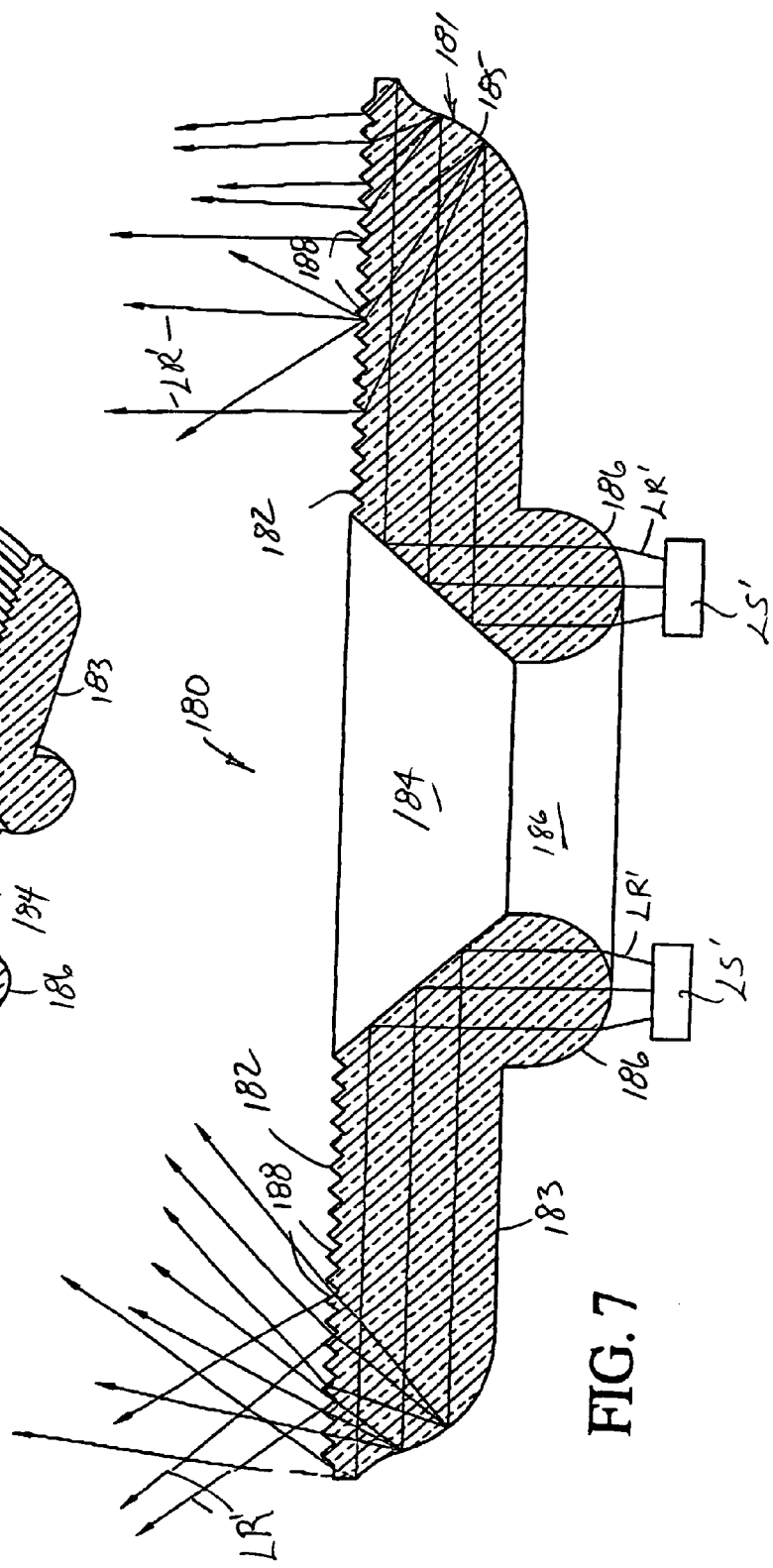

GAUGE WITH LARGE ILLUMINATED GAUGE FACE

FIELD OF THE INVENTION

The invention is directed to gauges, particularly gauges for vehicle (automobiles and trucks) applications, for indicating such conditions as speed, tach, fuel or the like.

Conventional gauges which are primarily sold in the automotive aftermarket are mounted in openings of bezels or upon vehicle dashboards, and normally include an illuminated gauge face and a dial which is rotated by a conventional motor and conventional circuitry to provide instantaneous output reflective of most any vehicle condition, such as speed, torque, tach, fuel, etc. Present gauges, though essentially acceptable to users thereof, lack substantially large well lit gauge face plates with comparable relatively large indicia thereon, particularly along the peripheral edge of the gauge face plate or dial plate, which are also adequately lighted to assure instant and accurate readability. Typical illuminated gauges of the type to which the present invention is directed include a variety of different designs reflected by U.S. Pat. Nos. 2,217,625; 2,280,700; 2,916,011; 4,163,428; 4,215,647; 4,218,726; 4,274,358; 4,771,368; 5,839,811; 5,905,374; 5,915,822; 5,934,782; 5,982,168; 6,137,399; 6,276,804 and 6,663,251.

Of the latter group of patents, U.S. Pat. No. 6,663,251 is perhaps most typical and discloses a gauge with a light-transmitting dial plate having a front face with indicia thereon which is illuminated by a light source behind the dial plate. A light-transmitting pointer rotates relative to the dial plate and an indicator or pointer thereof points generally radially toward the indicia as the pointer rotates in response to electrical signals. The dial plate is viewed through a transparent front face or lens which is held in position by a rim. There is also an annular spacer positioned between the dial plate and the front lens which is smaller than the housing in which the latter components are housed and appreciably smaller than the overall circumference and diameter of the internal surface of the housing and the exterior circumference and diameter of the dial plate. Therefore, an annular area at the outer circumference of the dial plate is hidden from view by the spacer, bears no indicia thereon and is not illuminated, thereby effectively reducing the area of the dial plate which is exposed to a viewer. By thus reducing the overall size of the dial plate and particularly the exterior peripheral illumination thereof, the indicia thereon must be smaller because the indicia is confined to a smaller area and is less readily distinguishable which is highly undesirable when a viewer looks at or checks such gauges instantaneously, particularly when driving at high speed (auto racing).

SUMMARY OF THE INVENTION

In accordance with the foregoing, the present invention provides a novel gauge which includes a housing having a relatively smaller diameter rear housing portion, a radially outwardly directed flange and a substantially larger diameter forward housing portion. Whether mounted in a separate outermost housing atop a dashboard or with the smaller diameter housing portion mounted within a opening of an automotive "A-pillar" or "A-column," the shoulder or flange of the larger diameter rear portion of the housing provides a seat upon which rests an outer peripheral portion of a light-diffuser plate and atop the latter a gauge face plate or dial plate having printed thereon appropriate indica. A transparent annular spacer ring is sandwiched between the printed gauge face plate and a large transparent front face lens with all of the latter components being held in place by a rim or bezel. Due to the step or shoulder creating a relatively larger housing portion of the overall gauge housing, the area of the light-diffuser plate and the printed gauge face plate can be appreciably increased particularly at a peripherally outermost annular portion thereof. This provides a larger total surface area upon which indicia can be applied resulting in larger individual indicia and correspondingly creates a gauge face plate or dial plate whose indicia can be quickly, readily and unmistakenly viewed and analyzed.

In further accordance with this invention a light pipe disc is provided between the light-diffuser plate or disc and a disc which carries light-generating means, such as LED's. The light pipe disc directs light rays through the light-diffuser plate and the gauge face plate or dial plate, particularly at the radially outermost circumferential edge portion thereof to assure maximum illumination of the printed gauge face plate, particularly the outermost peripheral edge and indicia located thereat and circumferentially spaced relatively thereto.

In further accordance with the present invention, a motor disc carries a motor having a pointer rotating shaft which projects axially outwardly of opposite ends of the motor. One of the ends is connected to and rotates the pointer relative to the printed gauge face plate, while the axially opposite shaft end is exposed through an opening in a bottom wall of the housing through which a back-up tool can be inserted to support the motor shaft when the pointer is assembled to the shaft to thereby prevent motor damage.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 6 is a is an axial cross-sectional perspective view of a light-diffuser plate, and illustrates a plurality of concentric angularly disposed annular facets of a front surface for distributing light uniformly across the rear of a dial plate to uniformly illuminate the entirety thereof.

FIG. 7 is an axial cross-sectional view of the light-diffuser plate or disc of FIG. 6, and illustrates light rays reflected and dispersed by the concentric annular angularly disposed facets of the front surface.

DETAILED DESCRIPTION OF THE INVENTION

Figure 2:
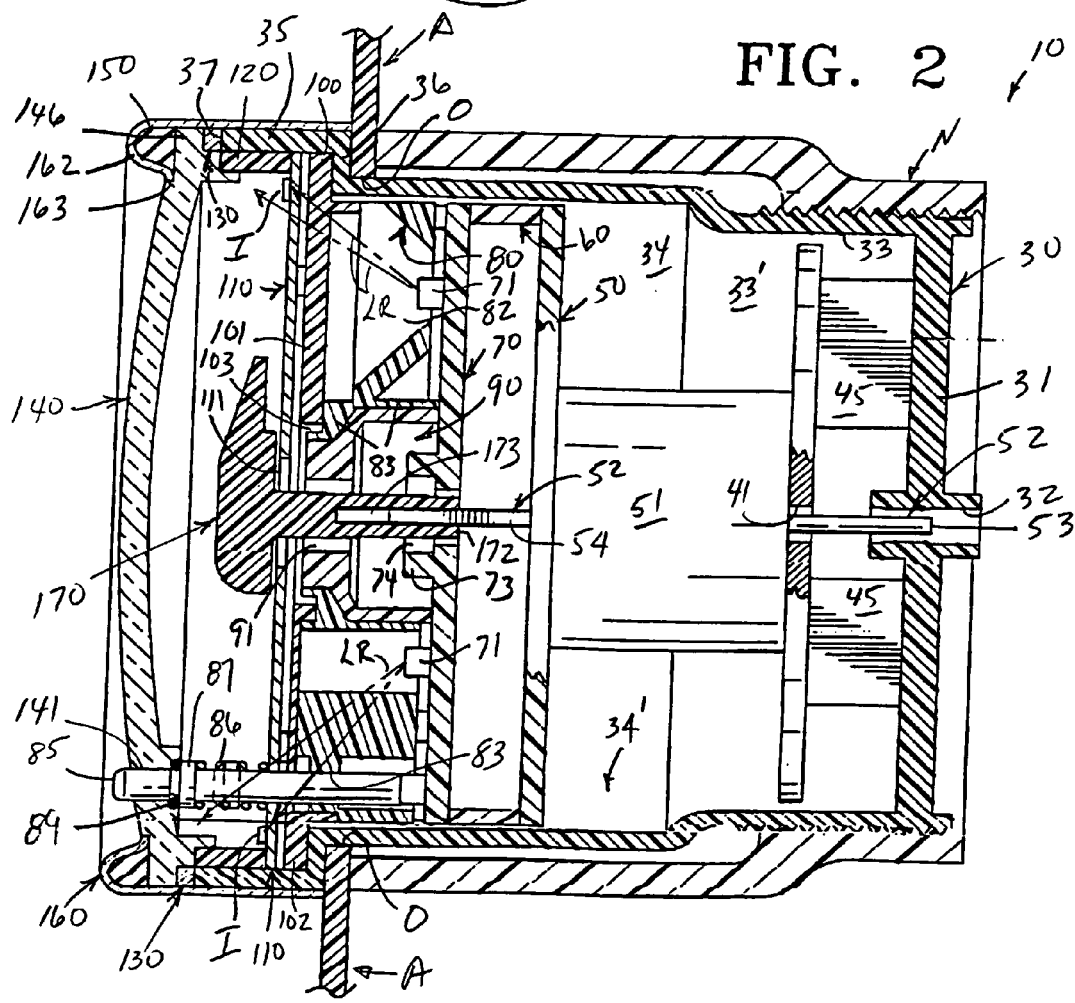
FIG. 2 is a fragmentary axial cross-sectional view of the gauge, and illustrates the gauge mounted in an opening of an "A-column" adjacent a vehicle front windshield, drivers side.

A gauge 10 constructed in accordance with this invention includes a plurality of components including a relatively large outer housing 20, a smaller inner housing 30, a circuit board, plate or disc 40, a motor board, plate or disc 50, an annular spacer ring 60, a light-generating board, plate or disc 70, an annular light pipe board, plate or disc 80, axially internally thereof an annular light pipe 90 (FIGS. 2 and 3), a light-diffuser board, plate or disc 100, a printed gauge face or dial plate 110, an annular transparent spacer ring 120, an annular seal or gasket 130, a large transparent front face lens 140, an annular seal or gasket 150, a rim or bezel 160, and a rotatable dial 170.

Figure 1:
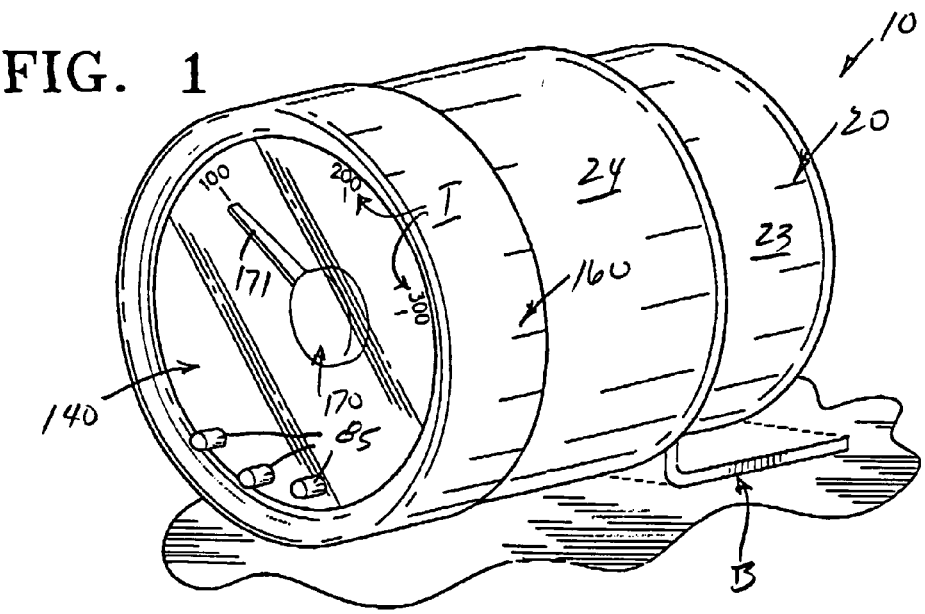
FIG. 1 is perspective view of the novel gauge constructed in accordance with this invention, and illustrates the gauge mounted on a vehicle dashboard and a relatively large front face lens though which can be seen a gauge face plate upon which indica is printed and a rotatable pointer associated therewith.

The large outer housing 20 of the gauge 10 includes a rear wall 21 (FIG. 3) having a circular opening 22 with the rear wall 21 merging with a relatively small diameter wall 23 which in turn merges with a larger diameter wall 24 having an axial annular end face 25. The entire outer housing 20 is formed of plastic material and the substantially cylindrical walls 23, 24 define respective small and large chamber portions 26, 27 with an internal surface (unnumbered) of the wall 23 having screw threads 28 formed therein. The large outer housing 20 is designed to be mounted, if desired, directly upon a portion of an automobile interior, such as a dashboard D (FIG. 1) by a conventional bracket B which may include, for example, a universal joint (not shown).

The smaller inner housing 30 includes an end wall 31 having an axial opening 32 which is oriented substantially oriented coaxially with the opening 22 of the rear wall 21 of the outer housing 20. The bottom or rear wall 31 blends with a substantially smaller cylindrical wall 33 which blends with a substantially larger cylindrical wall 34 which in turn merges with a still larger cylindrical wall 35 through a substantially radially oriented annular wall, shoulder or flange 36. The largest cylindrical wall 35 ends in an axial annular end face 37. Exterior threads 38 on the smallest diameter wall or wall portion 33 are threaded to or unthreaded from the threads 28 of the outer housing 20. The cylindrical wall portions 33, 34 and 35 define respective chamber portions 33', 34' and 35' of the inner housing 30. When the inner housing 30 is threaded via the threads 28, 38 into the outer housing 20, the flange 36 is brought into intimate abutting sealing relationship with the axial annular surface or face 25 of the cylindrical wall 24 of the outer housing 20.

The circuit board, plate or disc 40 is of a conventional construction and is of a substantially circular configuration having a central opening 41 and carries on either or both surfaces thereof conventional circuitry 45 which in part bottoms against or contacts an inner surface (unnumbered) of the rear wall 31 (FIG. 2) of the inner housing 30.

The motor board, plate or disc 50 carries a conventional electric motor 51 having a rotatable shaft 52 including axially opposite and axially oppositely directed shaft end portions 53, 54. The shaft end portion 53 projects through the axial openings or bores 41, 32 of the respective circuit disc 40 and rear wall 31 of the inner housing 30, as is best evidenced in FIG. 3, and is accessible through the opening 22 in the rear wall 21 of the outer housing 20 for a purpose to be described hereinafter.

The spacer ring 60 is of a generally annular configuration and is preferably constructed of transparent plastic. The spacer ring 60 is sandwiched between the motor disc 50 and a light-generating disc or board 70 which carries a plurality of LED's, LCD's or other light sources or light-generating means 71, such as incandescent, cold cathode, electroluminescent, or UV LED light sources and an associated phosphorous film that changes colors, as is disclosed in U.S. Pat. No. 6,106,127. The light sources 71 are conventionally disposed about the light board or light-generating disc 70 in a manner to direct rays of light to the left, as viewed in FIGS. 3 and 4, upon indicia I (FIG. 1) printed or otherwise applied upon an outermost surface (unnumbered) of the gauge plate 110. The light-generating disc 70 further includes an annular collar 73 (FIG. 3) and an axial opening 74 coaxial with the axis of the motor shaft 52.

Figure 3:
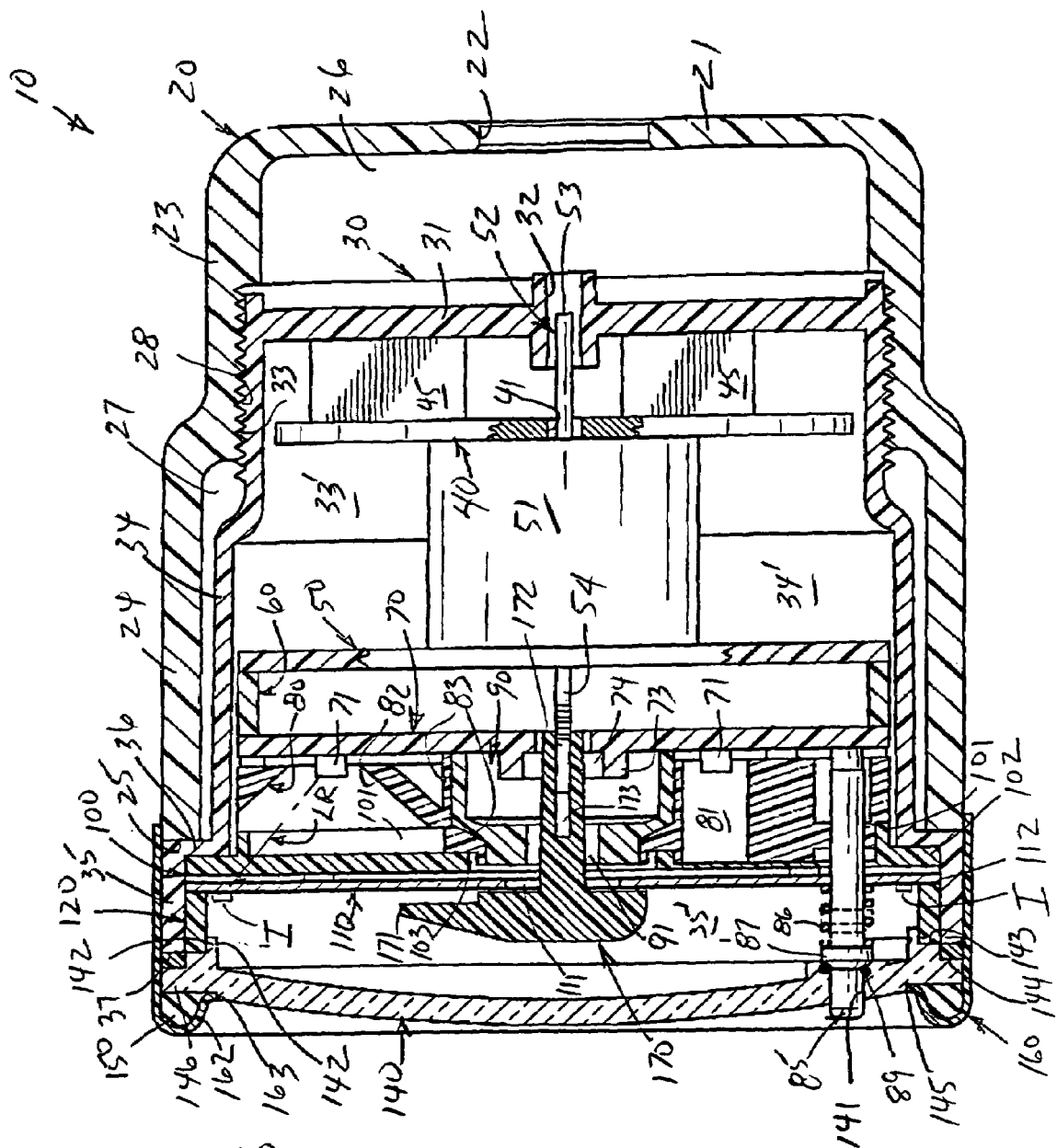
FIG. 3 is an enlarged axially cross-sectional view taken through the gauge of FIG. 1, and illustrates an inner gauge housing defined by an innermost cylindrical annular wall united by an annular wall or flange to an outermost larger cylindrical wall with a substantially annular transparent spacer ring axially spacing a large front face lens from an indicia-bearing gauge face plate and a light-diffuser plate seated on the annular transparent flange.

The annular light-diffuser disc 80 is constructed from transparent or translucent plastic material and includes a plurality of circumferentially located cylindrical light-guiding cavities 81 and a plurality of circumferentially located concavo-convex light-guiding cavities 82 into each of which a selected light-generating source 71 is inserted or aligned, as is best illustrated in FIG. 3. The concavo/convex light-guiding cavities 82 and the surfaces thereof which diverge to the left, as viewed in FIG. 3, assure that light rays emitted from the light-generating means 71 project upon and through the transparent/translucent light-diffuser plate 100, particularly in a radial outward direction and substantially entirely circumferentially thereabout. An axially located stepped collar 83 of the annular light pipe disc 80 intimately receives and houses the transparent/translucent annular axially located light pipe 90 which in turn has an opening or axial bore 91 aligned with the opening or bore 74 of the light-generating disc 70. The annular light pipe disc 80 also includes three bores 83 each slidably receiving a pin 85 biased to the left, as viewed in FIG. 3, by a spring 86. Ends (unnumbered) of the pins 85 each project through a bore 141 of the large front face lens 140 for manipulation thereof to perform function controls of the gauge 10 through the associated circuitry 45 in a conventional manner, including appropriate switches (not shown) which are controlled during appropriate sliding movement of the pin or pins 85. A radially outwardly directed annular collar 87 prevents each pin 85 from moving to the left beyond the position illustrated in FIGS. 2 and 3 of the drawings. An O-ring seal 89 surrounds each pin 85 and is sandwiched between each collar 87 and a rear surface (unnumbered) of the front face lens 140 to prevent moisture, dust and like contaminants from entering the gauge 10 through each bore 141. The transparent or translucent plastic light-diffuser plate 100 includes an axially inwardly directed collar 101 and projecting radially outwardly therefrom is a circumferential wall portion or flange 102 which seats upon the shoulder 36 of the inner housing 30. An axial opening or bore 103 of the light-diffuser plate 100 bears against the annular axially located light pipe or light diffuser 90, as is illustrated in FIG. 3.

The printed gauge face plate 110 is also made of transparent plastic material and the indicia I (FIGS. 1 and 3) is appropriate conventionally printed thereupon and may include such indicators as speed, torque, fuel, time, etc. An axial central opening 111 is coaxial to the shaft 52 of the motor 51 and an outer peripheral or circumferential edge portion 112 of the printed gauge face plate 110 extends completely into the chamber portion 35' and substantially against the internal cylindrical surface (unnumbered) thereof. The spacer ring 120 is also constructed from transparent plastic material and is relatively thin in its axial dimension such that only a minimal peripheral edge of the circumferential edge portion 112 of the printed gauge plate 110 is overlaid thereby. This permits maximum exposure of the indicia I and associated graduations and information upon the printed gauge face plate 110 to be viewed by the user of the gauge 10 under maximum and optimum conditions of illumination which occur because light rays LR emanating from the light sources 71 are directed radially outwardly to the very most outermost circumferential edge of the printed gauge face plate 110. The circumferential edge portion 112 which projects radially outwardly beyond the cylindrical wall 34 of the inner housing 30 augments the peripheral illumination of the indicia I on the printed gauge face plate 110 because the overall area of the printed gauge face plate or dial plate 110 is substantially increased permitting the indica I and gradient markings to be placed virtually at the very edge of the dial plate 110 and thus at a larger size than conventionally heretofore provided.

The dial 170 has a pointer 171 and a stem 172 which in turn includes a bore 173 is appropriately conventionally associated with the printed gauge face plate 110 and the indicia I thereupon. The shaft end portion 54 of the motor shaft 52 is fixed in the bore 173 of the stem 172 of the dial 170 and, as signals are received from engine and related automotive components through appropriate sensors and electrical lines through the aperture or opening 22 in the rear wall 21 and connected to the circuitry 45, the dial 170 is rotated appropriately by the electric motor 51. As is conventional, the dial 170 may be colored to present a contrast to the printed gauge face plate 110 and the indicia I thereupon.

The annular O-seal or gasket 130 prevents ambient conditions from adversely affecting the interior of the gauge 10 and a like seal (not shown) can also be provided for the same purpose between the shoulder 36 of the inner housing 30 and the end face 25 of the outer housing 20.

The large transparent front face or lens 140 includes in addition to the bores 141 earlier described, a rearward projecting annular wall 142, a pair of steps 143, 144 facing or opening toward the rear wall 21 of the outer housing 20 and an additional step or shoulder 145 facing radially outwardly. The seal or gasket 150 is positioned upon an outer peripheral surface portion 146 of the lens 140 and is substantially normal to the surface 145. The rim 160 is initially completely cylindrical and an innermost skirt portion 161 thereof is bonded or otherwise secured to the cylindrical wall 35 of the inner housing 30 (and/or the wall 24 of the outer housing 20). Thereafter, the cylindrical rim 160 is rolled to form a curl 162 which compresses the gasket or seal 150, brings all components into intimate relationship and a free inboard peripheral edge 163 of the rim 160 bears against the peripheral edge 145 of the transparent front face or lens 140.

As is best illustrated in FIG. 3 of the drawings, and as described heretofore, the light rays LR fully illuminate the entirety of the printed gauge face plate 110 and particularly the peripheral edge portion 112 thereof which has heretofore been unprovided due to the absence in any known/conventional gauges of both (a) an enlarged forward face due to the presence of the flange or shoulder 36 of the inner gauge housing 30 and (b) the construction of the light-diffuser plate or disc 80 which directs the light rays LR to the very outermost circumferential peripheral edge portion 112 of the printed gauge face plate 110. The latter allows the indicia I to be printed appreciably further outboard or radially outwardly from the axis of the gauge 20 than heretofore provided in known gauges which in turn allows the indicia I to be printed larger and thus more readily visually seen and comprehended by a viewer when the gauge 10 is in use.

In order to facilitate rapid and correct assembly of the various components of the gauge 10 heretofore described, the invention also includes several additional unique aspects, including sub-assemblies of the various discs or plates and rings heretofore described which are unitized prior to assembly into and with respect to the smaller inner housing 30.

Figure 4:
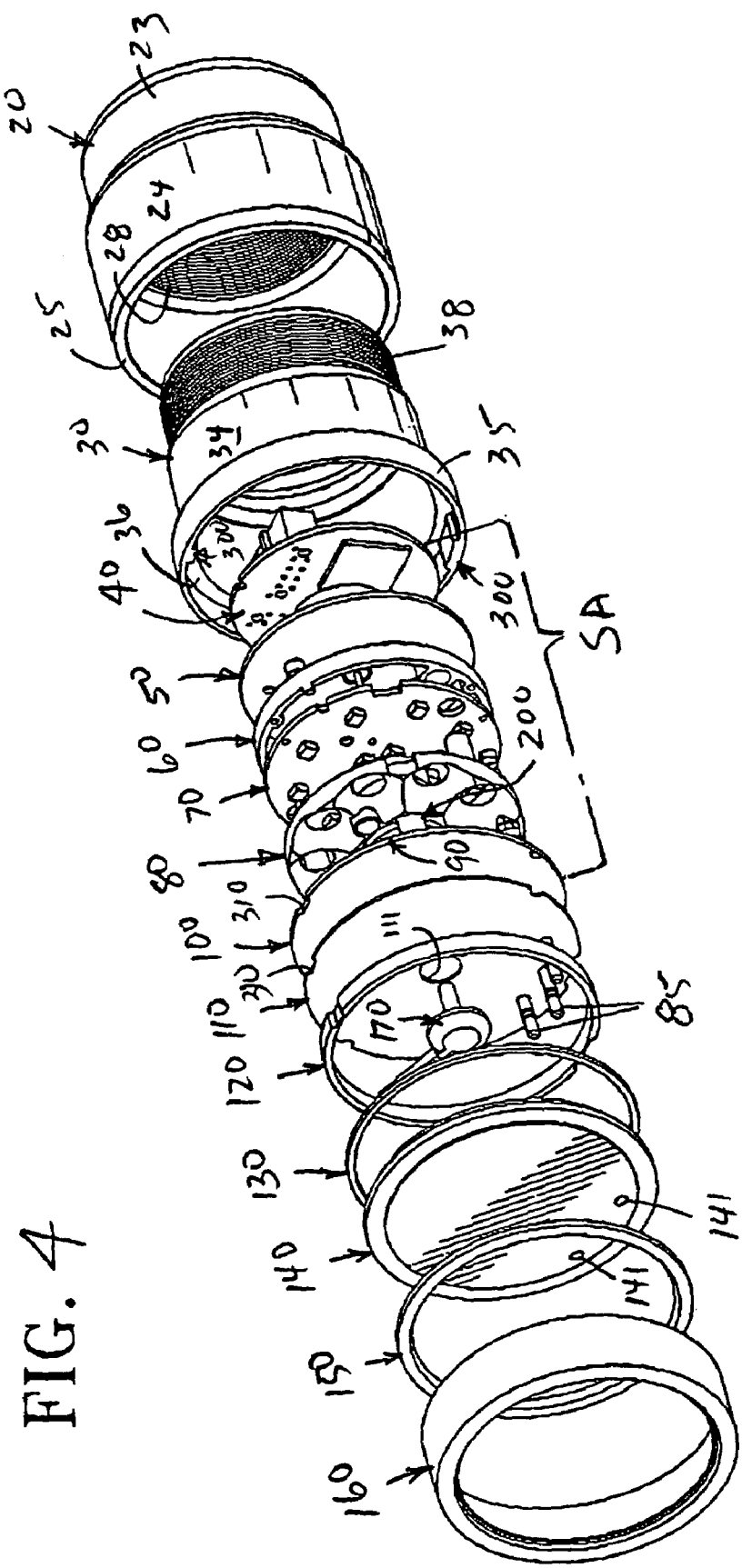
FIG. 4 is an exploded perspective view of the gauge of FIG. 3, and illustrates components thereof when viewed from left-to-right in FIG. 3.

As an example of the latter, the circuit board or circuit disc 40, the motor disc 50, the spacer ring 60, the light-generating disc 70, the annular light pipe disc 80, the associated annular axially located light pipe 90 and the light-diffuser plate 100 are preferably secured together as a subassembly SA (FIG. 4). The subassembly SA is first snap-secured together by a pair of snap-securing tongues 200 (FIG. 5) which are disposed in substantially diametrically opposite relationship and are of a length to snap behind the circuit disc 40 after the discs 40, 50, 70, 80, 100 and the spacer ring 60 and the light pipe 90 have been properly axially assembled and circumferentially oriented. Thereafter, the snap-secured together subassembly SA is primarily secured together by screws (not shown) passing through access openings of the latter discs, excluding the annular spacer 60 and the light pipe 90, and being united in threads of the endmost of the discs or nuts associated therewith. When thus assembled, the subassembly SA of FIGS. 4 and 5 of the drawings, can be inserted into the inner housing 30 to the position best illustrated in FIG. 3 with the motor shaft end portion 53 of the motor shaft 52 being partially located within the bore 32 of the rear wall 31 of the inner housing 30. At this time the outer housing 20 is not yet screw-threaded to the inner housing 30. The subassembly SA and the inner housing 30 are then positioned in a jig which includes a back-up mandrel (not shown) which is received in the bore 32 and engages the end (unnumbered) of the shaft end portion 53. As the remaining components, such as the printed gauge face plate 110, the spacer ring 120, etc., are positioned within the cylindrical wall 35, neither the inner housing 30 nor the shaft 52 can move to the right under any left-to-right assembly forces applied to the latter components. This is particularly true and of major importance upon the assembly of the dial 170 when the bore 173 of the stem 172 is forced upon the shaft end portion 54 of the motor shaft 52. Since the opposite shaft end portion 53 bottoms against the anvil (not shown) of the jig, an assembly force applied to the dial 170 from left-to-right, as viewed in FIG. 3, cannot be transmitted to the shaft 52. Thus, since the shaft 52 is rendered immobile during this assembly, the internal sensitive components of the motor 51 and those carried by the shaft 52 will not be damaged or in any fashion adversely effected. The aforementioned jig also provides backup for forces created when the cylindrical skirt or rim 160 is folded into the curl 162 as the final assembly step of the process.

Figure 5:
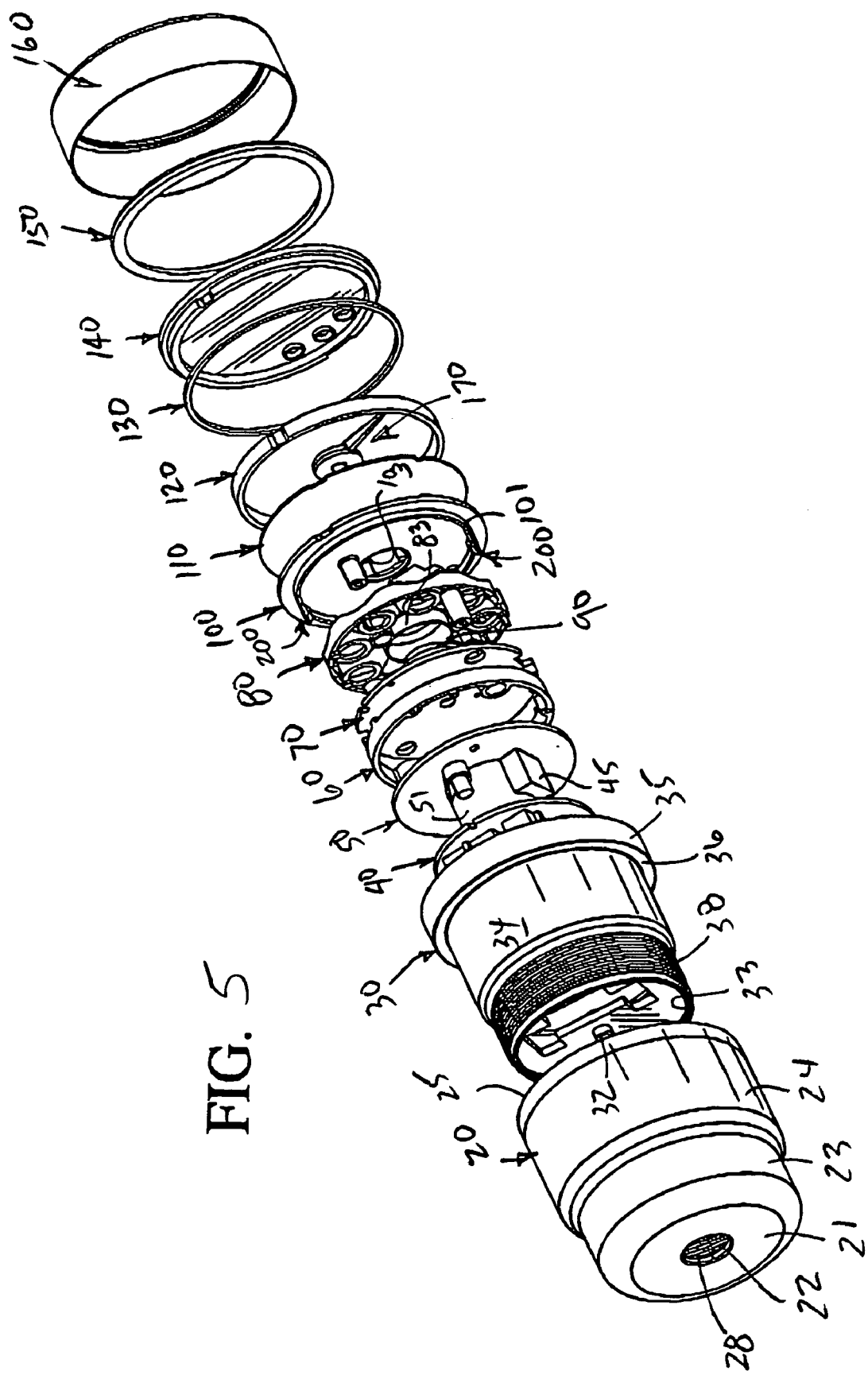
FIG. 5 is another exploded perspective view of the gauge of FIG. 3, and illustrates the components thereof when viewed from right-to-left in FIG. 3.

As can be appreciated from viewing FIGS. 4 and 5 of the drawings, it is absolutely essential that the individual components of the gauge 10 be accurately circumferentially assembled with respect to the inner housing 30, and the latter is accomplished by alignment means 300, 310 in the form of diametrically opposite inwardly projecting alignment ribs 300, 300 of the inner housing 30 and diametrically opposite alignment slots 310, 310 in the peripheries of each of the discs 100, 110, the spacer ring 120 and the transparent lens 140. Since the disc 100 is part of the subassembly SA, the diametrically opposite grooves 310, 310 thereof will accurately guide the subassembly SA via the ribs 300, 300 into the inner housing 30. Thereafter, the disc 110, the spacer ring 120 and the transparent lens 140 can be guided by the slots 310, 310 thereof into the inner housing 30 under the guidance of the ribs 300, 300.

As was described heretofore, the outer housing 20 of the gauge 10 is utilized when the gauge 10 is mounted by the bracket B upon the dashboard of an automotive (FIGS. 1 and 3) vehicle. However, when the gauge 10 is to be mounted in a hole or opening O in an automotive "A-pillar" or "A-column" (A in FIG. 2), the outer housing 20 is unthreaded from the inner housing 30 and the inner housing is appropriately inserted into and secured to the opening O by a special nut N in the manner readily apparent from FIG. 2. Normally, the standard A-pillar opening O is of a size corresponding to the maximum outside diameter of a conventional gauge. However, as noted earlier herein, the shoulder or flange 36 of the inner housing portion 30 (FIG. 3) projects well beyond the opening O and permits utilization of the larger size and area of the gauge dial face plate 110 then heretofore possible in prior art automotive gauges. The latter thereby achieves the utilization of larger indicia I than heretofore provided in conventional gauges.

In lieu of the annular light-diffuser disc 80 heretofore described, another light-diffuser disc 180 is illustrated in FIGS. 6 and 7 of the drawings and is generally designated by the reference numeral 180. The light-diffuser disc 180 is constructed from transparent or translucent plastic material and includes a generally annular body 181 defined by a front surface 182, a rear surface 183, an inner annular frusto-conical peripheral surface 184 and an outer peripheral surface 185. A generally axially projecting annular shoulder surface or collar surface 186 merges with the rear surface 183 and the inner peripheral surface 184, the latter of which is substantially frusto-conical and widens in a direction from the rear surface 183 toward the front surface 182. The front surface 182 is defined by a plurality of substantially concentric light ray-directing facets or lens 188 with each facet being defined by two walls disposed at an angle of substantially 90 degrees to each other. As light from a light source LS' directs light rays LR' toward the collar surface 186 and the rear surface 183, the light rays LR' are reflected/re-reflected in the manner indicated by the unnumbered headed arrows associated therewith in part by the annular frusto-conical surface 184 and thereafter by the multiplicity of facets 188 thereby substantially dispersing light uniformly across the front face 182 and upon a rear surface of a dial plate (not shown). Due to the uniform dispersion of the light rays LR' and the uniformity of the light exiting the facets 188 of the front surface 182, intense lighting of dial plates which create "night blindness" in the past is substantially entirely eliminated. Instead, the entire substantially larger face of the dial plate is uniformly illuminated from the rear, absent conventional light-intensity spots.

Figure 8:
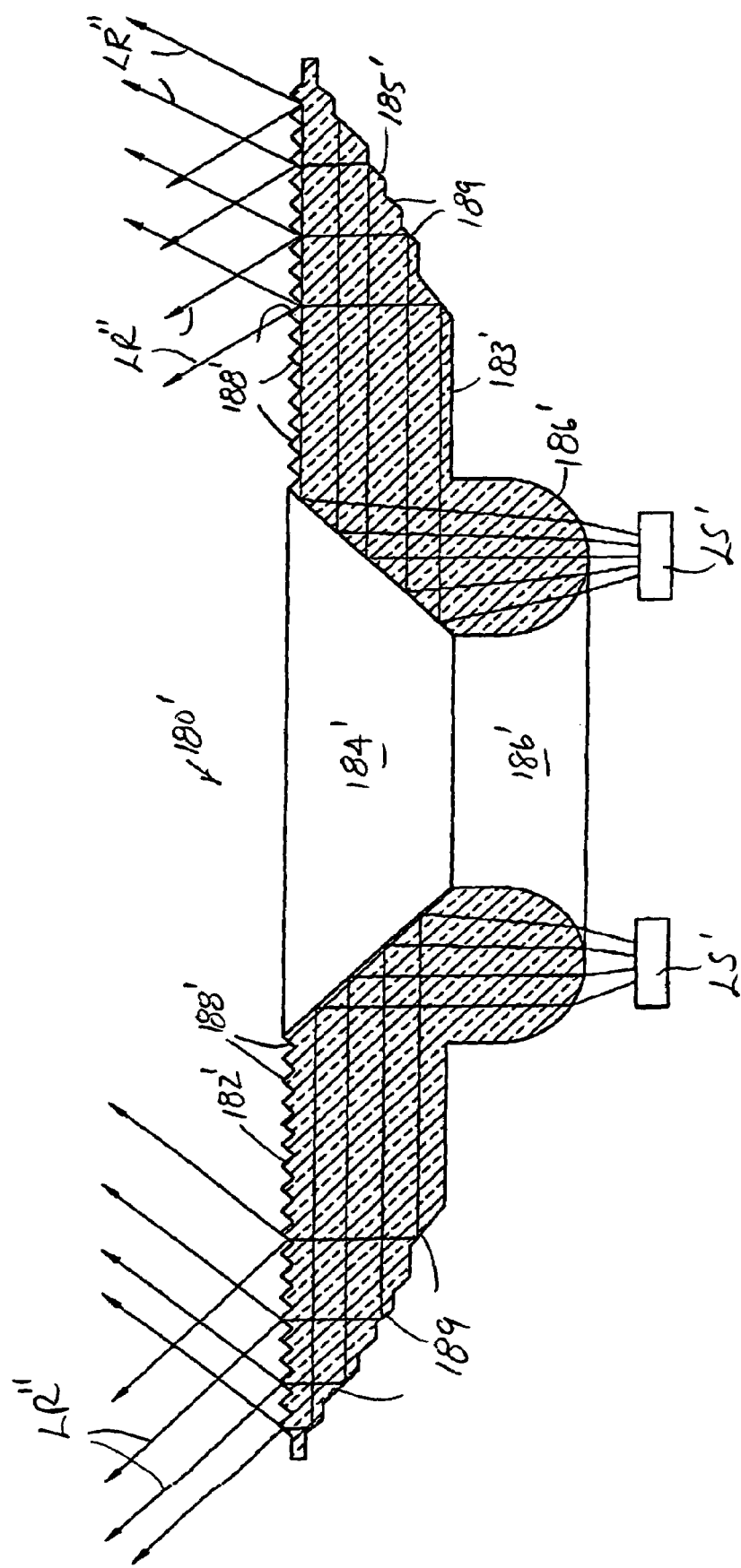
FIG. 8 is an axial cross-sectional view of another light-diffuser plate or disc, and illustrates light rays reflected and dispersed by concentric annular angularly disposed facets of front and outer peripheral surfaces of the light-diffuser disc.

Another substantially annular light-diffuser disc is illustrated in FIG. 8 of the drawings and is generally designated by the reference character 180' with additional prime numerals being applied thereto corresponding to like structure of the light diffuser 180, including a front surface 182' and concentric annular angularly disposed facets or lens 188'. In this case, the diffuser disc 180' includes at an outer peripheral surface 185' thereof a plurality of concentric annular facets or lenses 189 which create additional light ray reflection/diffusion than the light diffuser disc 180, as is readily apparent by comparing the generated and emitted light rays LR', LR'' designated by the headed arrows in FIGS. 7 and 8, respectively.

Although a preferred embodiment of the invention has been specifically illustrated and described herein, it is to be understood that minor variations may be made in the apparatus without departing from the spirit and scope of the invention, as defined by the appended claims.

What is claimed is:

1. A gauge housing comprising means for defining a chamber having first and second relatively larger and smaller chamber portions, means for generating substantially uniform total peripheral illumination through light rays emitted radially from a plurality of substantially peripherally disposed light rays generating means, means in said first larger chamber for passing the light rays therethrough, indicia means associated with said light rays passing means, means between said light rays generating means and said light rays passing means for diffusing the peripheral illumination prior to said light rays reaching said light rays passing means whereby said indicia means is substantially uniformly totally peripherally illuminated by diffused peripheral illumination, and means for effecting a peripheral space at a juncture of said first and second chamber portions to effect substantially uniform diffused total peripheral illumination impingement upon substantially the entirely of a peripheral portion of said light rays passing means.

2. The gauge housing as defined in claim 1 including pin means projecting through said light rays passing means for manually effecting control functions of an electronic instrument housed in said chamber.

3. The gauge housing as defined in claim 1 including means for circumferentially orienting and axially guiding said light rays passing means and said peripheral space effecting means relative to said first relatively larger chamber portion.

4. The gauge housing as defined in claim 1 including a motor in said smaller chamber portion, and opening means in a closed end of said smaller chamber portion through which a back-up tool can be inserted to abut said motor during gauge assembly.

5. The gauge housing as defined in claim 1 wherein said chamber defining means first and second chamber portions are defined by an inner housing located within an outer housing, and said juncture is in axial opposing relationship to an axial annular end wall of said outer housing.

6. The gauge housing as defined in claim 1 wherein said chamber defining means first and second chamber portions are defined by an inner housing located within an outer housing, said juncture is in axial opposing relationship to an axial annular end wall of said outer housing, and means for securing said juncture in abutting relationship to said axial annular end wall.

7. The gauge housing as defined in claim 1 wherein said chamber defining means first and second chamber portions are defined by an inner housing located within an outer housing, said juncture is in axial opposing relationship to an axial annular end wall of said outer housing, means for securing said juncture in abutting relationship to said axial annular end wall, and said securing means includes a bezel.

8. The gauge housing as defined in claim 1 wherein said chamber defining means first and second chamber portions are defined by an inner housing located within an outer housing, said juncture is in axial opposing relationship to an axial annular end wall of said outer housing, means for securing said juncture in abutting relationship to said axial annular end wall, said securing means includes a bezel, and a substantially transparent viewing panel having a peripheral edge portion sandwiched between said bezel and an axial annular end wall of said inner housing.

9. The gauge housing as defined in claim 1 wherein said peripheral space effecting means is a peripheral edge portion of one of a light ray transmitting panel defined by said light rays passing means and a light ray diffusing panel defined by said diffusing means.

10. The gauge housing as defined in claim 1 wherein said peripheral space effecting means is a peripheral edge portion of one of a light ray transmitting panel defined by said light rays passing means and a light ray diffusing panel defined by said diffusing means, and said light rays generating means is carried by a panel spaced axially inboard of said light ray panel peripheral edge portion and said juncture.

11. The gauge housing as defined in claim 1 wherein said peripheral space effecting means is a peripheral edge portion of one of a light ray transmitting panel defined by said light rays passing means and a light ray diffusing panel defined by said diffusing means seated in axial opposing relationship to said juncture.

12. The gauge housing as defined in claim 1 wherein said light rays passing means and said peripheral space effecting means are each defined by a panel, and said panels are of at least one of a size and peripheral outline to preclude entry thereof into said smaller chamber portion.

13. The gauge housing as defined in claim 1 wherein said light rays passing means and said peripheral space effecting means are each defined by a panel, said panels are of at least one of a size and peripheral outline to preclude entry thereof into said smaller chamber portion, and said peripheral space effecting means panel includes a peripheral edge portion in abutment with said juncture.

14. The gauge housing as defined in claim 1 wherein said light rays passing means and said peripheral space effecting means are each defined by a panel, said panels are of at least one of a size and peripheral outline to preclude entry thereof into said smaller chamber portion, and said peripheral space effecting means panel includes a circumferential portion in abutment with said juncture.

15. The gauge housing as defined in claim 1 including lens means between said light rays generating means and said peripheral space effecting means for directing light rays toward said peripheral space effecting means.

16. The gauge housing as defined in claim 1 including lens means between said light rays generating means and said peripheral space effecting means for directing light rays toward said peripheral space effecting means, a motor panel carrying a motor located inboard of said light rays generating means; and means for unitizing said light rays generating means, said lens means, said motor panel and said peripheral space effecting means as a unitized subassembly for unitized insertion into said chamber means.

17. The gauge housing as defined in claim 1 including lens means between said light rays generating means and said peripheral space effecting means for directing light rays toward said peripheral space effecting means, a motor panel carrying a motor located inboard of said light rays generating means; and means for unitizing said light rays generating means, said lens means, said motor panel and said peripheral space effecting means as a unitized subassembly for unitized insertion into said chamber means with a peripheral edge portion of said peripheral space effecting means being seated upon an annular juncture wall portion between said first and second chamber portions.

18. The gauge housing as defined in claim 1 including an exterior housing defining an exterior chamber housing at least said smaller chamber portion.

19. The gauge housing as defined in claim 1 including an exterior housing defining an exterior chamber housing at least said smaller chamber portion, and means for supporting said exterior housing upon a support surface.

20. The gauge housing as defined in claim 2 including an electronic instrument including gauge function electronics housed in said chamber, and said pin means being mounted for axial sliding movement relative and substantially parallel to an axis of said chamber for selectively manually operating said gauge function electronics.

21. The gauge housing as defined in claim 2 including an electronic instrument including gauge function electronics housed in said chamber, and said pin means being a plurality of pins each mounted for axial sliding movement relative and substantially parallel to an axis of said chamber for selectively manually operating said gauge function electronics.

22. The gauge housing as defined in claim 2 including an electronic instrument including gauge function electronics housed in said chamber, said pin means being mounted for axial sliding movement relative and substantially parallel to an axis of said chamber for selectively manually operating said gauge function electronics, and means biasing said pin means in a direction away from said second smaller chamber portion.

23. The gauge housing as defined in claim 2 including an electronic instrument including gauge function electronics housed in said chamber, said pin means being mounted for axial sliding movement relative and substantially parallel to an axis of said chamber for selectively manually operating said gauge function electronics, a lens outboard of said light rays passing means, opening means in said lens and said light rays passing means in which said pin means slide, and means for sealing said lens opening means and pin means relative to each other to prevent entry of exterior medium into said chamber through said lens opening means.

24. The gauge housing as defined in claim 22 wherein said pin means are a plurality of pins.

25. The gauge housing as defined in claim 22 including an electronic instrument including gauge function electronics housed in said chamber, said pin means being mounted for axial sliding movement relative and substantially parallel to an axis of said chamber for selectively manually operating said gauge function electronics, a lens outboard of said light rays passing means, opening means in said lens and said light rays passing means in which said pin means slide, and means for sealing said lens opening means and pin means relative to each other to prevent entry of exterior medium into said chamber through said lens opening means.

26. The gauge housing as defined in claim 25 wherein said pin means are a plurality of pins.

27. The gauge housing as defined in claim 3 wherein said circumferentially orienting and axially guiding means are cooperative grooves and ribs, one of said grooves and ribs are formed in said light rays passing means and said peripheral space effecting means, and the other of said grooves and ribs are formed in said larger chamber portion.

28. The gauge housing as defined in claim 3 wherein said circumferentially orienting and axially guiding means are cooperative grooves and ribs, said grooves are formed in said light rays passing means and said peripheral space effecting means, and said ribs are formed in said larger chamber portion.

29. The gauge housing as defined in claim 4 wherein said motor includes an axially projecting portion axially aligned with said closed end opening means which is abutted by a back-up tool during gauge assembly.

30. The gauge housing as defined in claim 4 including an exterior housing having an exterior peripheral wall substantially surrounding said chamber portions and an end wall with an access opening aligned with said closed end opening means for entry of a back-up tool during gauge assembly and exit of wiring for installation purposes.

31. The gauge housing as defined in claim 4 including an exterior housing having an exterior peripheral wall substantially surrounding said chamber portions, an end wall with an access opening aligned with said closed end opening means for entry of a back-up tool during gauge assembly and exit of wiring for installation purposes, wiring exiting said access opening, and means sealing said access opening and wiring to prevent a medium form entering said exterior housing through said access opening.

32. A gauge housing comprising a housing body defined by a substantially large peripheral wall, a relatively smaller peripheral wall and an annular wall defining a juncture between said large and smaller peripheral walls; said large and smaller peripheral walls defining relatively large and smaller chambers, means in one of said chambers for generating substantially uniform total peripheral illumination through light rays emitted radially from a plurality of substantially peripherally disposed light rays generating means toward the large peripheral wall of said large chamber, a light-transmitting panel of a peripheral size accommodated to and located within said large chamber adjacent to but axially spaced from said annular wall, indicia means associated with said light transmitting panel, an illumination diffusion panel located between said light transmitting panel and said light rays generating means for diffusing the peripheral illumination prior to the light rays reaching the light-transmitting panel, and means for maintaining said light-transmitting panel in axial spaced relationship to said annular wall whereby diffused peripheral illumination will impinge upon substantially the entirety of a peripheral edge portion of said light-transmitting panel.

33. The gauge housing as defined in claim 32 including a pointer having a shaft and a pointer arm, and said pointer shaft projects through an opening in said light-transmitting panel.

34. The gauge housing as defined in claim 33 wherein at least some of said indicia are upon said light-transmitting panel peripheral edge portion.

35. The gauge housing as defined in claim 33 including a substantially transparent front face panel overlying said light-transmitting panel and closing said large chamber.

36. The gauge housing as defined in claim 33 including a substantially transparent front face panel overlying said light-transmitting panel and closing said large chamber, said substantially transparent front face panel having a peripheral outermost edge portion and a substantially annular axially projecting wall radially inboard of said peripheral outermost edge portion, said annular axially projecting wall is in internal telescopic relationship to said large peripheral wall, and said front face panel peripheral outermost edge portion rests upon an annular face of said large peripheral wall.

37. The gauge housing as defined in claim 33 including a substantially transparent front face panel overlying said light-transmitting panel and closing said large chamber, a bezel defined by a peripheral skirt merging with a channel wall having an inboard edge, said peripheral skirt being in exterior surrounding relationship to said large peripheral wall, said channel wall being in axial overlying relationship to said transparent front face panel peripheral edge portion, and a terminal peripheral edge of said channel wall seats against an annular shoulder of said transparent front face panel peripheral edge portion.

38. The gauge housing as defined in claim 35 including pin means projecting through said substantially transparent front face panel and said light-transmitting panel for manually effecting control functions of an electronic instrument housed in at least one of said chambers.

39. The gauge housing as defined in claim 33 including a substantially transparent front face panel overlying said light-transmitting panel and closing said large chamber, a bezel defined by a peripheral skirt merging with a channel wall having an inboard edge, said peripheral skirt being in exterior surrounding relationship to said large peripheral wall, said channel wall being in axial overlying relationship to said transparent front face panel peripheral edge portion, a terminal peripheral edge of said channel wall seats against an annular shoulder of said transparent front face panel peripheral edge portion, and said terminal peripheral edge and said annular shoulder are of a substantially cylindrical configuration having an axis of revolution corresponding to an axis of said large and smaller chambers.

40. The gauge housing as defined in claim 32 including an exterior housing substantially housing said housing body, and means for removably securing said exterior housing relative to said housing body.

41. The gauge housing as defined in claim 32 including an exterior housing substantially housing said housing body, and means for removably securing said exterior housing relative to said housing body smaller peripheral wall.

42. The gauge housing as defined in claim 40 wherein said exterior housing includes an annular terminal end face seated against said juncture annular wall.

43. The gauge housing as defined in claim 42 including a transparent panel having a peripheral edge portion seated upon a terminal annular end face of said large peripheral wall, a bezel defined by a peripheral wall merging with a concavo-convex channel wall terminating in a terminal edge, said bezel peripheral wall being in exterior telescopic relationship to said housing body large peripheral wall, said concavo-convex channel wall opening toward and in axially opposing relationship to said transparent panel peripheral edge portion, and said concavo-convex channel wall terminal edge being in abutting relationship to a shoulder of said transparent panel.

44. A method of assembling an instrument which includes a housing into which is to be inserted any electric motor having a shaft to which is to be secured a pointer comprising the steps of:
   (a) providing a housing having a peripheral wall defining a chamber and an opening at axially opposite ends thereof,
   (b) providing an electric motor having a motor shaft with axially opposite exposed shaft ends,
   (c) axially telescopically uniting a pointer upon one of the shaft ends through axial movement of the pointer toward an opposite one of the shaft ends, and
   (d) preventing movement of the opposite one shaft end during the performance of step (c) thereby preventing electric motor damage.

45. A method of accurately assembling a plurality of gauge components in gauge housing comprising the steps of:
   (a) providing a first plurality of gauge components of which at least one gauge component is a disc carrying a pair of latching tongues, (b) snap-securing the first plurality of gauge components together utilizing the latching tongues to form a unitized subassembly,
(c) providing the subassembly and a gauge housing with axially alignable ribs and grooves,
(d) axially slidably assembling the gauge housing and subassembly through relative sliding movement of the ribs and grooves,
(e) providing at least one additional gauge component which includes grooves mirroring the grooves of the subassembly, and
(f) axially slidably assembling the additional gauge component through relatively sliding movement of the grooves thereof and the housing ribs.

46. The method as defined in claim 45 wherein the additional gauge component is one of a second plurality of gauge components.

47. The method as defined in claim 45 wherein the additional gauge component is one of a second plurality of gauge components, and at least one of the second plurality of gauge components includes grooves mirroring the grooves of the subassembly.

48. The method as defined in claim 45 wherein the additional gauge component is a ring.

49. The method as defined in claim 45 wherein the additional gauge component is a disc.

50. A gauge housing comprising means defining a chamber, a lens closing an opening of said housing, a light diffuser panel inboard of said lens, a bore in each of said lens and panel, said bores being substantially axially aligned, a control pin slidable in said bores, means for biasing said pin toward said lens, a collar carried by said pin, and an O-ring seal between said collar and said lens bore for preventing the entry of contaminants through said lens bore into said chamber.

* * * * *